US007223060B2

(12) United States Patent  
Weidenmüller (10) Patent No.: US 7,223,060 B2
(45) Date of Patent: May 29, 2007

(54) DEVICE FOR SIMULTANEOUSLY CONVEYING AND REGULATING THE TEMPERATURE OF SHAPED PARTS

(75) Inventor: Ralf Weidenmüller, Weil am Rhein (DE)

(73) Assignee: Sacmi Cooperativa Meccanici Imola S.C.A.R.L., Imola (IT)

( * ) Notice: Subject to any disclaimer, the term of this patent is extended or adjusted under 35 U.S.C. 154(b) by 106 days.

(21) Appl. No.: 10/496,569

(22) PCT Filed: Nov. 13, 2002

(86) PCT No.: PCT/EP02/12653

§ 371 (c)(1),
(2), (4) Date: Sep. 29, 2004

(87) PCT Pub. No.: WO03/045823

PCT Pub. Date: Jun. 5, 2003

(65) Prior Publication Data

US 2005/0069390 A1    Mar. 31, 2005

(30) Foreign Application Priority Data

Nov. 13, 2002   (DE) ................................ 101 57 703

(51) Int. Cl.
*B65G 35/00* (2006.01)
(52) U.S. Cl. ................ 414/676; 406/88; 406/159; 406/183
(58) Field of Classification Search ............... 414/676; 406/88, 89, 159, 183
See application file for complete search history.

(56) References Cited

U.S. PATENT DOCUMENTS

| | | | | | |
|---|---|---|---|---|---|
| 3,607,198 | A | * | 9/1971 | Meunier et al. | ........... 65/182.2 |
| 3,761,134 | A | * | 9/1973 | Hurd | ............................ 406/83 |
| 3,773,391 | A | * | 11/1973 | Crandall et al. | .............. 406/88 |
| 3,890,011 | A | * | 6/1975 | Futer | ............................. 406/83 |
| 3,947,236 | A | * | 3/1976 | Lasch, Jr. | ..................... 432/11 |
| 3,976,330 | A | * | 8/1976 | Babinski et al. | .............. 406/84 |
| 4,365,915 | A | * | 12/1982 | Neumann | ..................... 406/88 |
| 4,378,182 | A | * | 3/1983 | Futer | ............................ 406/10 |
| 4,462,796 | A | * | 7/1984 | Amundson et al. | ........... 432/58 |
| 4,630,975 | A | * | 12/1986 | Becker | ........................ 406/85 |

(Continued)

FOREIGN PATENT DOCUMENTS

EP   0 619 251 A   10/1994

*Primary Examiner*—Joe Dillon, Jr.
(74) *Attorney, Agent, or Firm*—Nixon & Vanderhye P.C.

(57) ABSTRACT

The invention relates to a device for simultaneously conveying and regulating the temperature of shaped parts, comprising a conveying device, which is suited for advancing objects, and at least one blower by means of which the objects can be subjected to the action of an air flow while being advanced. The conveying device is characterized in that it is formed by a closed channel whose clearance height approximately corresponds to the height of an individual shaped part, whose clearance width at least along a portion of its length is greater by a multiple than the width of an individual shaped part, in whose base plate a multitude of air inlet openings are arranged with a blowing direction oriented in the longitudinal direction of the channel and diagonal to the surface, and in whose cover plate, which is situated opposite the base plate, a multitude of air inlet openings are placed. The air flow produced by the blower can be introduced into the channel via the air inlet openings.

23 Claims, 5 Drawing Sheets

U.S. PATENT DOCUMENTS

| | | | | |
|---|---|---|---|---|
| 4,738,748 A | * | 4/1988 | Kisa | 438/727 |
| 4,744,702 A | * | 5/1988 | Wiseman et al. | 406/88 |
| 5,009,550 A | * | 4/1991 | Hilbish et al. | 406/87 |
| 5,122,016 A | * | 6/1992 | Lenhart | 406/86 |
| 5,222,840 A | * | 6/1993 | Ingraham et al. | 406/88 |
| 5,466,096 A | | 11/1995 | Hilbish et al. | |
| 5,501,552 A | * | 3/1996 | Simkowski | 406/52 |
| 5,501,553 A | * | 3/1996 | Simkowski | 406/88 |
| 5,503,505 A | * | 4/1996 | Vejchoda | 406/88 |
| 5,549,423 A | * | 8/1996 | Lenhart | 406/86 |
| 5,570,977 A | * | 11/1996 | Simkowski et al. | 406/88 |
| 5,634,636 A | * | 6/1997 | Jackson et al. | 271/225 |
| 5,682,977 A | | 11/1997 | White | |
| 5,842,818 A | * | 12/1998 | Simkowski | 406/88 |
| 5,868,549 A | * | 2/1999 | Lee et al. | 414/791.6 |
| 6,224,298 B1 | * | 5/2001 | Tsuji et al. | 406/88 |
| 6,336,775 B1 | * | 1/2002 | Morita et al. | 406/88 |
| 6,361,041 B2 | * | 3/2002 | Stephan | 271/195 |
| 6,398,461 B1 | * | 6/2002 | Vincent et al. | 406/79 |
| 6,505,483 B1 | * | 1/2003 | Hoetzl et al. | 65/25.2 |
| 6,676,365 B2 | * | 1/2004 | Adam et al. | 406/83 |
| 6,736,588 B1 | * | 5/2004 | Baldwin et al. | 414/676 |

\* cited by examiner

DEVICE FOR SIMULTANEOUSLY CONVEYING AND REGULATING THE TEMPERATURE OF SHAPED PARTS

This application is the US national phase of international application PCT/EP02/12653 in Deutsch on filed 13 Nov. 2002, which designated the US. PCT/EP02/12653 claims priority to DE Application No. 101 57 703.6 filed 24 Nov. 2001. The entire contents of these applications are incorporated herein by reference.

BACKGROUND OF THE INVENTION

The invention concerns an apparatus for simultaneously conveying and regulating the temperature of shaped parts according to the preamble to claim 1. Such apparatuses, which shall hereinafter be called temperature-regulating conveyors, are known and are particularly used to remove by conveying plastic shaped parts directly after production thereof in a press-stamping machine and simultaneously rapidly cool them down to a temperature at which their shape is stable. One example of a plastic shaped part in which this is required is a screw cap for a drinks bottle. Such caps, which may for example consist of polypropylene or polyethylene, are produced in great numbers by injection moulding and are then removed from the mould in the machine at a temperature of approximately 100° C., whereby their form is not yet stable. In order to be able to take them directly to further processing after their production, they must be cooled as quickly as possible down to the specified processing temperature. The throughput of the cooling apparatus must be thereby adapted to the high production rate of today's injection-moulding machines, which produce about 1200 caps per minute.

Prior-art temperature-regulating conveyors typically consist of a conveyor belt and of fans located thereabove that blow temperature-regulated air onto the conveyor belt. However, in order to achieve a high throughput with such an arrangement, a great length and/or width of conveying line and therefore a correspondingly great size of temperature-regulating conveyor is required.

A conventional apparatus for the conveying and simultaneous cooling of substrates for data-carrying discs such as CDs, DVDs or the like is known from DE 199 07 210 A1, wherein the substrates rest on carriers during conveying, which carriers slide on an air cushion. Conveying occurs by means of the air cushion along an open channel with a U-shaped section, in the base plate of which a plurality of diagonal air inlet openings are provided for the production of an air cushion with a horizontal stream component. In order to guide part of the cooling air flow onto the substrates, each of the carriers has a vertical and several substantially horizontal holes, which together form a distribution system, through which air in the carrier can flow out, first centrally upwards and then laterally via the substrate. This apparatus is specially designed for the requirements of DC and DVD production and is relatively expensive because of the carriers with an internal air-distribution system that are required.

U.S. Pat No. 4,418,482 discloses an apparatus for simultaneous conveying and cooling of plastic bottles after ejection from a injection-moulding machine. The bottles lie with their necks on two rollers that are parallel to one another and rotate in opposite directions to one another along a fissure between these rollers. The main part of each bottle protrudes thereby into a hollow space underneath this fissure, wherein an air stream is blown for cooling. The manner of operation of this apparatus is based on the shape of the plastic bottles and is suitable only for objects of such or of a similar shape.

DE 25 09 469 B2 relates to a pneumatic conveying system for conveying pieces of matter, whereby the conveying line is constituted by a vertically extending channel that is closed on all sides. An upwardly directed air stream is created in the channel by blowing in air via diagonal openings on one side of the channel, the open cross-section of which channel corresponding approximately to the cross-section of the conveyed matter, the conveyed matter in the channel being moved upwards by the dynamic pressure of the air stream. The apparatus serves exclusively for the conveying of the conveyed matter. Its temperature is of no interest.

Lastly, JP 2000 280 265 A shows a cooling apparatus for objects made of plastic, wherein containers circulate in a chamber that is cooled by an air stream. The objects are continuously placed in the containers as they arrive and after one cycle in the chamber they are taken out of the containers again.

SUMMARY OF THE INVENTION

In view of this state of the art, the object of the invention is to create a temperature-regulating conveyor that is of compact size that is able to regulate with great uniformity the temperature of a high throughput of shaped parts.

This object is achieved according to the invention by an apparatus with the features of claim 1. Advantageous embodiments are shown in the appended claims.

The special feature of the invention lies in the double function of the air stream provided to cool the shaped parts, which air stream by creating dynamic pressure also directly causes the advancing of the shaped parts. A separate conveying apparatus in the form of a belt or the like is thereby advantageously dispensed with.

Furthermore, the shaped parts, that serially come singly out of the mould-injection machine, are distributed diagonally to the conveying direction over a given width and are conveyed parallel next to one another, whereby the length of the conveying line can be kept relatively short. The shaped parts are then preferably grouped for direct further processing in a serial sequence and are released individually after one another.

BRIEF DESCRIPTION OF THE DRAWINGS

An example of an embodiment follows that is disclosed by drawings. In these drawings.

DESCRIPTION OF THE PREFERRED EMBODIMENTS

Figure 1:
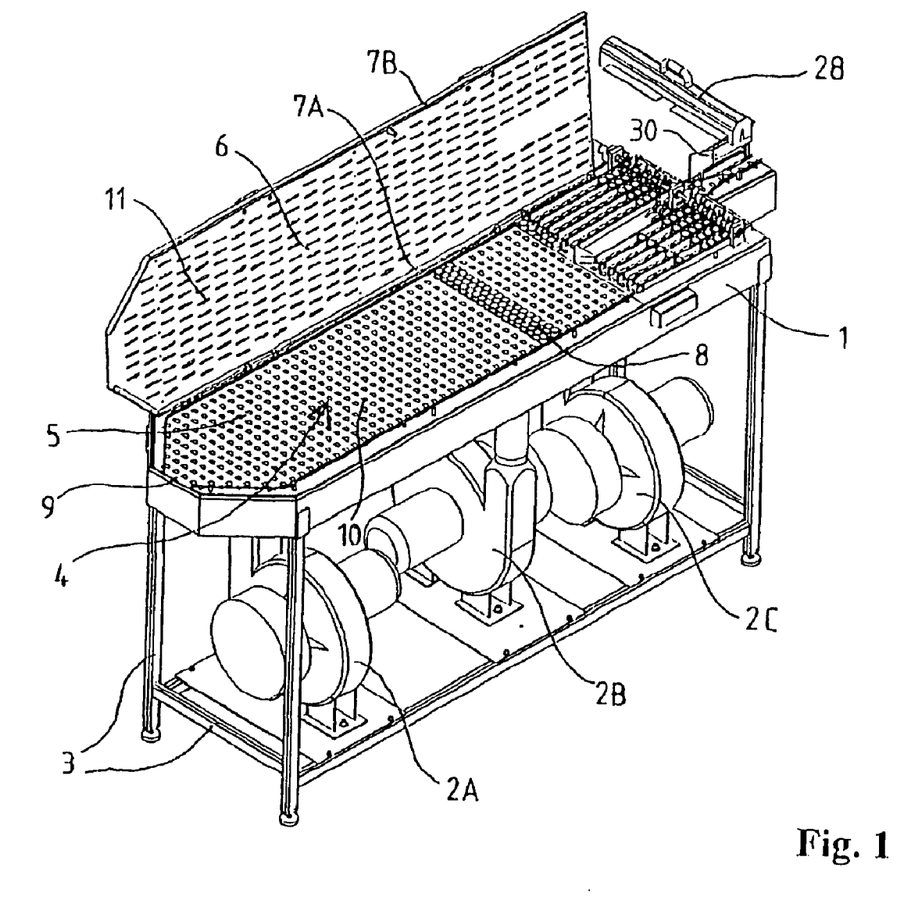
FIG. 1 shows a first perspective view of a temperature-regulating conveyor according to the invention with a view of the inlet for shaped parts with open cover plate.

As FIG. 1 shows, in the case of a temperature-regulating conveyor according to the invention the conveying device is assembled on the top side of a tub-shaped oblong housing 1, which housing 1 together with the adjustable blowers 2A to 2C arranged underneath is mounted on a carrier frame 3 comprising rail sections that are bolted together.

Figure 2:
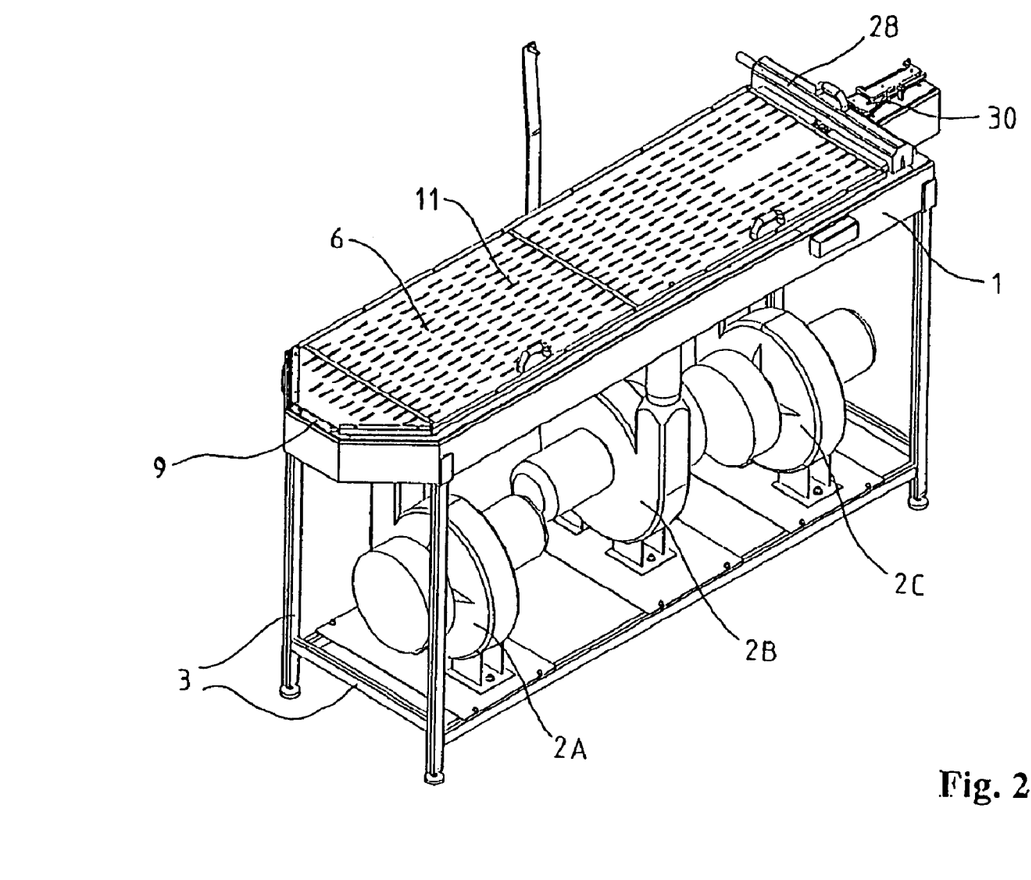
FIG. 2 shows the view of a temperature-regulating conveyor according to the invention viewed from the same direction as in FIG. 1, but ready for operation with closed cover plate.

The conveying device is an elongated straight channel 4 that is formed by a horizontal base plate 5, a cover plate 6 and two side walls 7A and 7B, wherein both side walls 7A and 7B on the longitudinal edges of the cover plate 6 are firmly connected to said cover plate and the cover plate 6 is in turn connected on a longitudinal side with the base plate 5 by means of a hinge in such a way that the channel 4 can be opened through simple opening of the cover plate 6 for maintenance or repair work. During operation the cover plate 6 is parallel to the base plate 5, so that the channel 4 is closed. This situation is shown in FIG. 2. Whereas the housing 1, the base plate 5 and the side walls 7A and 7B may consist of different plastics or of metal, a transparent material, such as for example Plexiglas is preferred for the cover plate 6 in order that operation of the apparatus can be observed without difficulty and faults can be immediately recognised.

The channel 4 has a rectangular section that is constant over the greater part of its length. Whilst the clear height of the channel 4 is roughly the same as the height of the shaped parts 8 that are to be conveyed, the width of the channel 4 is many times wider than the width of such a shaped part 8. It will be subsequently assumed that the shaped parts 8 are screw caps 8 for drinks bottles, some of which are illustrated in FIG. 1 and FIGS. 3 to 5. As can be seen in these Figures, it is further assumed that these caps 8 are conveyed to the temperature-regulating conveyor from the injection-moulding machine with the open side uppermost. It is furthermore assumed that the caps 8 arrive individually serially, so that the main part of the inlet 9 is narrower and first widens out from the inlet 9 and then maintains a constant width.

In the base plate 5 a plurality of air inlet openings 10 (FIG. 3) are arranged in a regular matrix-shaped arrangement, namely with a blowing direction in the longitudinal direction of the channel 4 and at an angle of approximately 45° to the surface of the base plate 5. The shape of the air inlet openings 10 is comparable with the shape of the rear of the cutting tools of a commercially available cheese scraper, i.e. it consists of ellipsoid vaulting of the base plate 5 downwards, the depth of the base plate 5 exceeding the thickness of the base plate 5, the vaulting ending abruptly in a straight cut in the base plate 5 that extends diagonally to the base plate 5, so that at this cut a vertical opening exists. The air inlet openings 10 lead to an externally insulated cavity inside the housing 1, which cavity is connected by pipes to the blowers 2A to 2C in such a way that during operation of the blowers 2A to 2C the air blown into the housing 1 by the latter flows out of the air inlet openings 10 diagonally upwards into the channel 4.

The adjustable blowers 2A to 2C are preferably equipped individually or jointly with at least one filter and optionally also with heating and thus provide an adjustable throughput of purified air at a pre-settable temperature. Cleaning the air flow by filters may for example be necessary when there are particular hygienic requirements of the caps 8 the temperature of which is to be regulated in view of their later use for packaging foodstuffs or medicines.

Heating of the air stream may be of interest in the event of major fluctuations in ambient temperature.

In the cover plate 6 there are also a plurality of slit-shaped air inlet openings 11 with a regular matrix-shaped arrangement, so that during operation of the apparatus inside the channel 4 there is a virtually homogenous air stream that moves diagonally upwards. Obviously, hot caps 8 inserted into the channel 4 at the inlet are through the effect of this air stream conveyed along the length of the channel 4 and are simultaneously cooled by convection. The caps 8 slide as a result of the vertical component of the air stream with their bottoms virtually free of friction on an air cushion over the surface of the base plate 5 and are moved forwards along the length of the channel 4 by the dynamic pressure that the horizontal component of the air stream builds up on them. The opposite cover plate 6 prevents uncontrolled vertical movements, such as may for example occur through collisions between caps and ensures through the fixing of channel height at a value that is only just above the height of the caps that no cap can be overturned and thereby cause a blockage to material flow.

Through the widening of the width of the channel 4 to many times the diameter of a cap 8 it is ensured that even with a comparatively slow advancing of the caps 8 in the channel 4 a sufficiently high throughput can be reached by the caps arriving rapidly individually at the input 9 being able to be distributed over the entire width of the channel 4, as shown in FIG. 1 in the form of three rows of caps 8.

If the caps need to be placed in containers for the purposes of storage or shipment after cooling, a kind of funnel would suffice as an outlet of the temperature-regulating conveyor wherein the caps 8 could be conveyed by the air stream. But if the caps have to be immediately conveyed to further processing, they must be again grouped in the serial sequence in which they arrive at the inlet 9. This task is performed by further sections of the preferred embodiment of the invention that are connected to the section disclosed above. These further sections are explained below by means of FIGS. 3 to 5, wherein a small general overview of the temperature conveyer and alongside it an enlarged section that is indicated in the general overview by a frame are illustrated.

Figure 3:
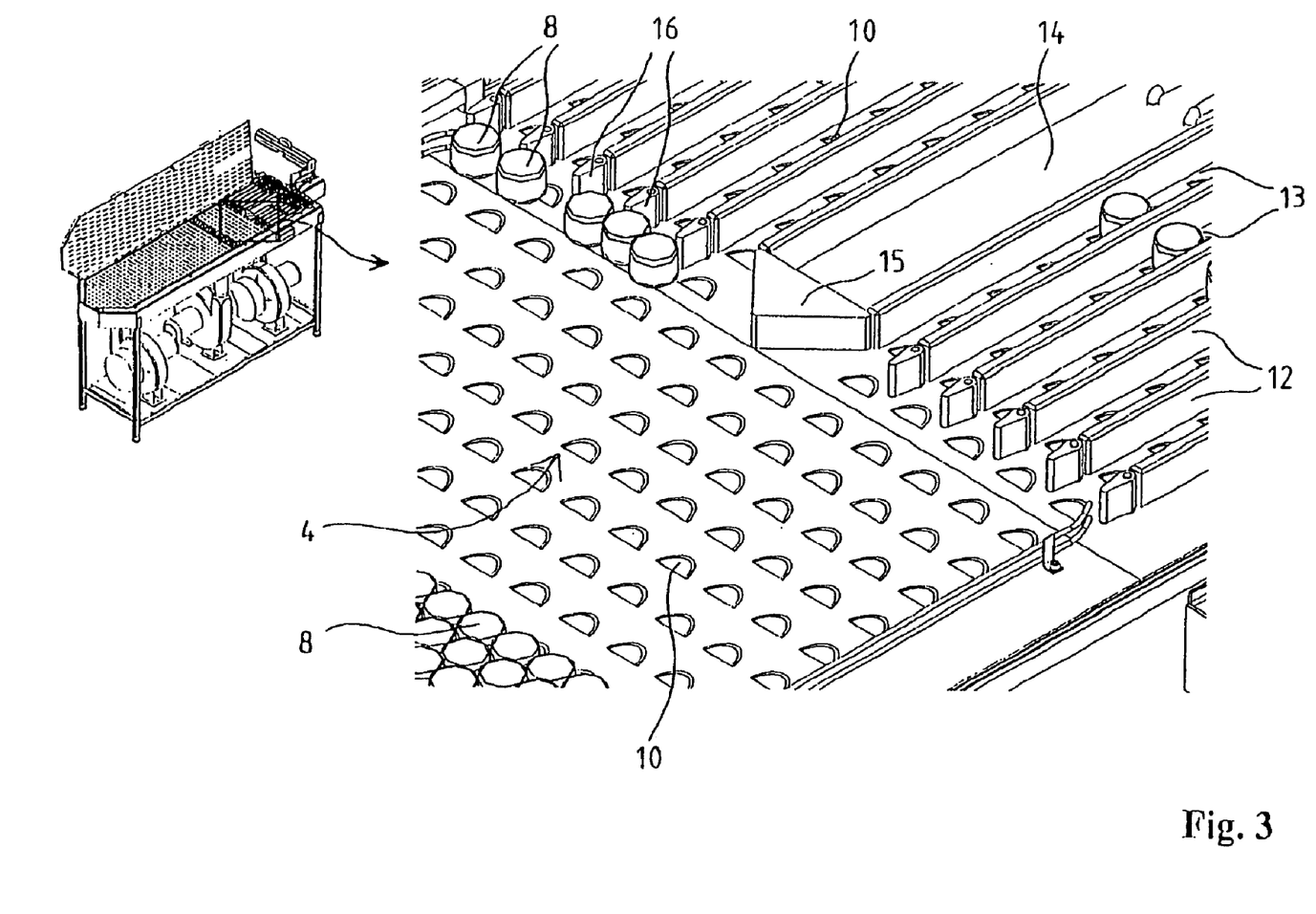
FIG. 3 shows an enlargement of a first detail of the view in FIG. 1.

As FIG. 3 shows, the channel 4 branches off first into a series of partial channels 13 that extend parallel to one another and are separated from one another by thin dividing walls 12, the clear width of which partial channels 13 corresponds approximately to the diameter of a cap 8. The air inlet openings 11 in the base plate 5 are continued in the partial channels 13, like the air intake openings 11 in the cover plate 6 above the partial channels 13. Advancing of the caps 8 therefore occurs inside the partial channels 13 just as before in the common channel 4, but is now no longer distributed at random over the width of the device but in several straight columns.

As FIG. 3 shows, the total of ten partial channels 13 in the example do not fill the entire width of the channel 4, the partial channels 13 are rather organised into two symmetrical groups of five, between which an intermediate space 14 that is not used for partial channels 13 exists. At the front of this intermediate space 14 to the channel 4 there is a wedge-shaped deflector 15, which distributes the caps arriving from the channel 4 as equally and free of congestion as possible between both groups of partial channels 13. For this purpose the deflector 15 is movably placed in the base plate 5 and is made to periodically oscillate during operation of the apparatus through a drive under the base plate 5.

On the front sides of the dividing walls 12 smaller, equally wedge-shaped but more acute deflectors 16 are provided that are intended to cause uniform filling of the individual partial channels 13 of each group and prevent blockages at the entrances to the partial channels 13, for which reason the deflectors are rotationally positioned around a vertical axis and are driven during operation of the device to an oscillating movement like that of a ship's rudder. The rotation axis is always near the front surface of the dividing wall 12, so that the point of a deflector 16 protruding into the channel 4 has maximum deflection.

Figure 4:
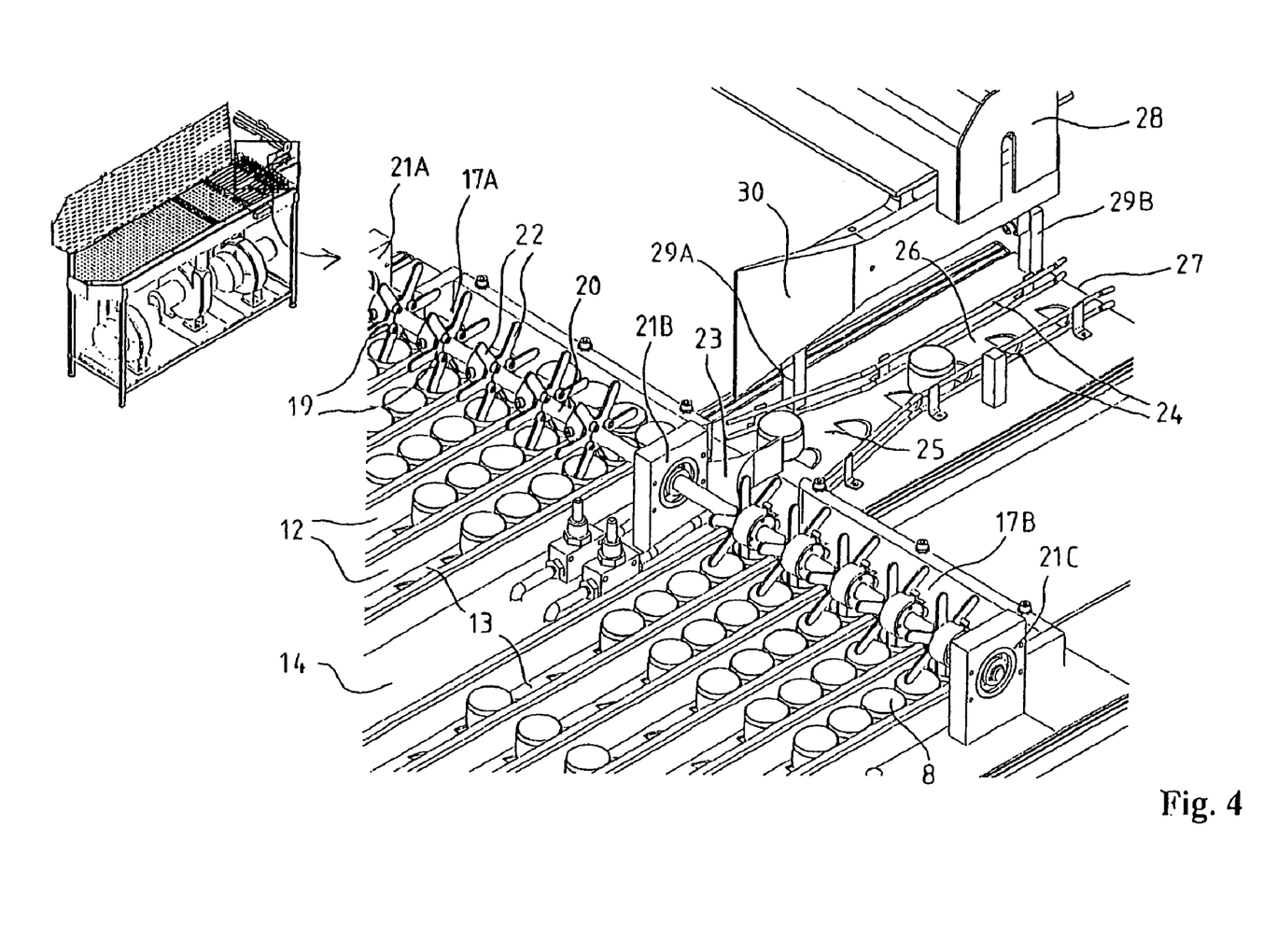
FIG. 4 shows an enlargement of a second detail of the view in FIG. 1.

In order to bring the different columns of caps 8 in the individual partial channels 13 together to form a single column, the outlets of each of both symmetrical groups of partial channels 13 first enter a collection channel 17A or 17B, as can be seen in FIG. 4. The clear width of the collection channels 17A and 17B corresponds roughly to the diameter of a cap 8, and the advancing of the shaped parts in the collection channels 17A and 17B and in the end channel 18 occurs as previously in the channel 4 and in the partial channels 13 through an air stream directed diagonally upwards, which originates in air intake openings 10 of the type disclosed previously in the base plate 5.

As the collection channels 17A and 17B extend transversely to the partial channels 13, it is necessary to intervene in a deterministic manner between these two types of channels in the material flow in order to avoid a blockage in this place. For this purpose, at the outlets of the partial channels 13 a discharge device 19 is provided that can either block the outlet of the partial channel 13 or release a single cap 8 from the partial channel 13. For this purpose, the discharge device 19 is shaped as a star-shaped wheel 19 that is fitted to a shaft 20 that extends transversely to the partial channels 13 and above them, which shaft 20 is under the control of a control device (not shown in the Figures) that can be locked or rotated around a preset angle by a drive. Driving and locking occur respectively in the zone of one or several of the bearings 21A, 21B and 21C of the shaft 20.

The shape of the wheel 19 is adapted to the shape of the caps 8 in such a way that if a cap 8 is under the wheel one of the teeth 22 thereof grips the cap 8 and holds it when the wheel 19 comes to a halt. At one rotation of the wheel 19 around a given angle exactly one cap 8 is conveyed out of the outlet of the partial channel 13 into the respectively assigned collection channel 17A or 17B. The star wheels 19 of the partial channels 13 of each of both symmetrical groups are oriented on the shaft 20 aligned with respect to one another and rigidly coupled so that blocking or releasing of caps 8 occurs simultaneously in all partial channels 13 of a group.

On the other hand, the wheels 19 of the left-hand group of partial channels 13 entering the collection channel 17A opposite the wheels 19 of the right-hand group entering the collection channel 17B are fitted staggered on the shaft 20 around half an angle between two teeth 22. In this way with a rotation of the shaft 20 around the angle between two teeth 22 only on one of the two sides will the front row of caps be conveyed to the respectively assigned collection channel 17A or 17B, so that in a sequence of several such rotations of the shaft 20 around the angle the caps will be removed and further conveyed alternately from the two groups of partial channels 13. A condition for this is that apart from the disclosed arrangement of the star wheels 19 on the shaft 20 there is also a suitable dimensioning of the length of the teeth 22 in relation to the dimensions of the caps 8 and their number per wheel 19.

The two collection channels 17A and 17B oriented towards one another at the front are divided in the middle by a deviating piece 23 in the form of a wedge that is concavely rounded on both sides and deviates again by 90° the movement of the caps 8 arriving from the collection channels 17A and 17B so that the advancing direction of the caps again corresponds to the advancing direction of the caps in the partial channels 13. After deviation on the deviating piece 23 the movement is taken sideways by guide rails 24, which in the zone of the deviating piece 23 first delimit an end channel 26 that leads to the outlet 27 of the apparatus and the clear width of which corresponds approximately to the diameter of a cap 8.

Advancing of the caps 8 in the collection channels 17A and 17B and in the passage 25 and in the end channel 26 occurs as in the channels 4 and 13 disclosed above through an air stream blown diagonally downwards, however with the difference that the slit cover plate 6 no longer reaches these zones. The collection channels 17A and 17B are also covered by a removable hood 28 just like the end sections of the partial channels 13, the shape of which hood 28 is determined by the space requirements of the star wheels 19, whilst the passage 25 and the end channel 26 are closed by an openable lid 30 at the top that is supported by two lateral supports 29A and 29B. In FIG. 4 this lid 30 is shown in its open state.

Owing to the alternating provision of the collection channels 17A and 17B with groups of five caps 8 by the star wheels 19 on the deviation piece 23 a extending together of these groups in the manner of a zip fastening is achieved, if the rotation speed of the shaft 20 is adapted to the conveying time of the caps 8 in the collection channels 17A and 17B. In this way a possible jamming in the funnel-shaped passage 25 between the deviation piece 23 and the end channel 26 is avoided. At the outlet 27 a serial sequence of individual caps 8 appears as it is taken to the apparatus at its input 9 (FIGS. 1 and 2).

Figure 5:
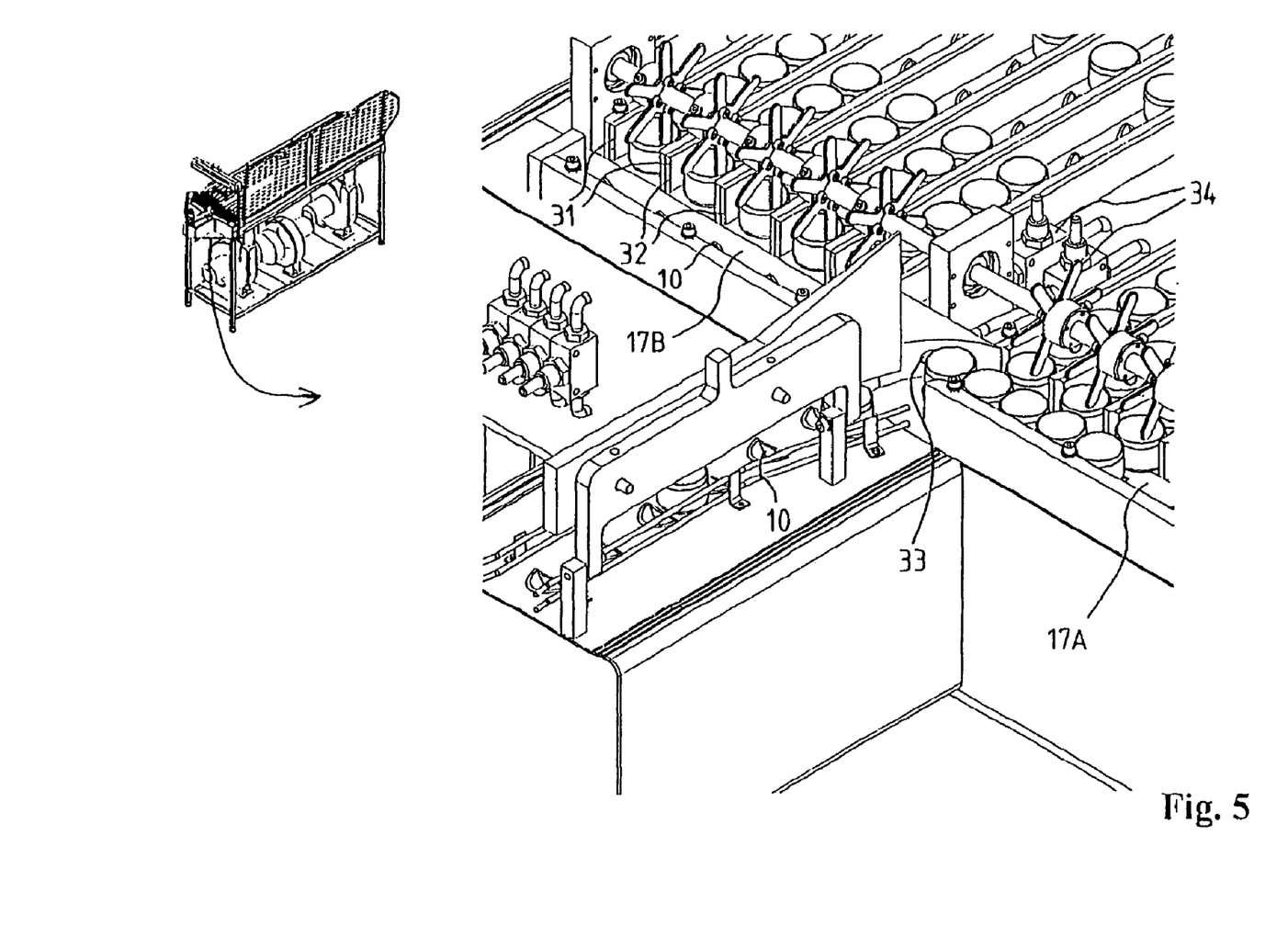
FIG. 5 shows a further enlargement of the second detail of FIG. 1, but viewed from another direction than in FIG. 4, namely with a view of the outlet for shaped parts.

In FIG. 5, which shows the same part of the apparatus as in FIG. 4 from another viewpoint, certain further details of the pneumatic control of the advancing of the caps 8 are recognizable. In order to better check the movement of the caps at the passage from the partial channels 13 into the collection channels 17A and 17B and in particular to avoid collisions of the caps 8 with the front surfaces 31 of the dividing walls 12 pointing to the collection channels 17A and 17B, small air inlet nozzles 32 are diagonally arranged in these front surfaces 31, wherefrom during operation an additional air stream is blown diagonally into the collection channels 17A and 17B, which promotes the movement of the caps 8 onto the deviation piece 23.

In the deviation piece 23 two further air inlet nozzles 33 are furthermore also provided, one of which only is partially visible in FIG. 5. During operation of the apparatus a further additional air stream blows out of these nozzles 33 in the direction of the end channel 26 and thereby promotes the deflection of the caps 8 on the deviation piece 23. The two valves 34 visible in FIGS. 4 and 5 and the hoses extending therefrom in the direction of the deviation piece serve to supply the nozzles 33 with air.

Owing to the even arrangement of the air inlet openings 10 in the base plate 5 and of the air outlet openings 11 in the cover plate 6 with a suitable setting of the air throughput on the blowers 2A to 2C and of the distribution of the flow in the housing 1 by means of control lids and the like that may be provided there it can be guaranteed that inside the channels 4, 13, 17A, 17B and 26 a given minimum excess pressure dominates with respect to the environment. This prevents dust particles or unhealthy bacteria reaching the caps 8 that are to be conveyed via the inlet 9, the outlet 27, or the air inlet openings 11. Through the deliberate addition of a bactericide gas, e.g. ozone, to the air blown into the housing 1 it is even possible to sterilise the caps 8 during conveying.

Although shaped parts have been discussed above and the preferred embodiment refers specially to caps for drinks bottles, it is obvious that the invention can be used for the simultaneous conveying and temperature regulating of any type of object that has an essentially beaker or bowl shape and which by weight and surface features is suitable for sliding on an air cushion.

The invention claimed is:

1. Apparatus for simultaneously temperature-regulating and conveying shaped parts, with a conveying device suitable for advancing said shaped parts and with at least one blower, by which said shaped parts are subjected to an air stream during advancing, whereby the conveying device has a channel, in the base plate of which a plurality of air inlet openings are arranged with a blowing direction oriented in the longitudinal direction of the channel and diagonally to a surface of said base plate, and wherein the air stream is simultaneously used for advancing and regulating the temperature of the shaped parts, wherein said channel is closed, the clear height of said channel approximately corresponding to the height of a single shaped part, the clear width of said channel at least along one part of the length thereof being many times greater than the width of a single shaped part, and in the cover plate of said channel opposite to the base plate a plurality of air inlet openings being arranged, and wherein the air stream produced by said at least one blower is introducible into said channel through the air inlet openings in order to directly achieve thereby advancing and temperature regulating of the shaped parts and wherein said channel branches at the end thereof into a plurality of partial channels, whose clear width corresponds approximately to the width of a shaped part, wherein advancing of the shaped parts occurs in said channel.

2. Apparatus according to claim 1, wherein at the end of the partial channels a discharge device is arranged, which can either block the outlet of the partial channel or release a single shaped part therefrom.

3. Apparatus according to claim 2, wherein the discharge device has the form of a star-shaped wheel that is fitted on a shaft that extends transversely to the partial channel and above it, that is optionally lockable or rotatable by a preset angle by means of a drive, and wherein the shape of the wheel is adapted to the shape of the shaped parts in such a way that if a shaped part is present under the wheel one of the teeth of said wheel interacts with the shaped part in such a way that the shaped part is held by the wheel in the event of a standstill of the wheel and the shape part is conveyed by a preset angle from the outlet of the partial channel in the event of a rotation of the wheel.

4. Apparatus according to claim 2, wherein the discharge devices of the partial channels are coupled with one another by group in such a way that blocking or releasing of a shaped part occurs simultaneously in all partial channels of a group.

5. Apparatus according to claim 3, wherein the discharge devices of the partial channels are coupled with one another by group in such a way that blocking or releasing of a shaped part occurs simultaneously in all partial channels of a group.

6. Apparatus according to any one of claims 1 to 5, wherein outlets of the partial channels enter collection channels whose outlets in turn enter a single common end channel, whereby the clear width of the collection channels and of the end channel correspond approximately to the width of a shaped part and wherein in the collection channels and in the end channel air inlet openings of the same type as in the channel and in the partial channels are provided for advancing the shaped parts.

7. Apparatus according to claim 6, wherein all partial channels extend parallel to one another and to the channel and two symmetrically mirrored collection channels oriented towards each other transversely with respect to the partial channels are provided, the collection channels ending on a symmetrical deviation piece in the shape of a wedge bent concavely on both sides in the shape of a funnel in the common end channel that extends in turn parallel to the partial channels.

8. Apparatus according to claim 7, wherein the discharge devices of the partial channels entering a common collection channel form two groups and wherein both groups of discharge devices are mechanically coupled together in such a way that releasing of the shaped piece occurs alternately either into only one or into only the other of the collection channels.

9. Apparatus according to claim 7, wherein a control device is provided that controls the discharge devices in such a way that at any moment only shaped pieces arrive at the deviation piece from one of the two collection channels.

10. Apparatus according to claim 1, wherein at a passage of the partial channels on the front surfaces of separating walls between the partial channels wedge-shaped deflectors are arranged that are rotatable in the manner of a ship's rudder and are displaceable in a periodic oscillation movement by means of a drive.

11. Apparatus according to claim 1, and further comprising at least one filter for cleaning the air stream producible by the blower.

12. Apparatus according to claim 1, and further comprising a temperature-regulating device, by means of which the temperature of the air stream producible by the blower is adjustable.

13. Apparatus according to claim 1, wherein the air throughput of the blower is adjustable in such a way that within all conveying spaces in which shaped parts move a preset minimum overpressure with respect to the environment dominates.

14. Apparatus for simultaneously temperature-regulating and conveying shaped parts, with a conveying device suitable for advancing said shaped parts and with at least one blower, by which said shaped parts are subjected to an air stream during advancing, whereby the conveying device has a channel, in the base plate of which a plurality of air inlet openings are arranged with a blowing direction oriented in the longitudinal direction of the channel and diagonally to a surface of said base plate, and wherein the air stream is simultaneously used for advancing and regulating the temperature of the shaped parts, wherein said channel is closed, the clear height of said channel approximately corresponding to the height of a single shaped part, the clear width of said channel at least along one part of the length thereof being many times greater than the width of a single shaped part, and in the cover plate of said channel opposite to the base plate a plurality of air inlet openings being arranged, and wherein the air stream produced by said at least one blower is introducible into the channel through the air inlet openings in order to directly achieve thereby advancing and temperature regulating of the shaped parts, and wherein the channel branches at its end into a plurality of partial channels, whose clear width corresponds approximately to the width of a shaped part, wherein advancing of the shaped parts occurs in the channel, and at each end of which a discharge device is arranged, which can either block the outlet of the partial channel or release a single shaped part therefrom, wherein at a passage of the channel into the partial channels on the front surfaces of separating walls between the partial channels wedge-shaped deflectors are arranged that are rotatable in the manner of a ship's rudder and are adapted to be displaceable in a periodic oscillation movement by means of a drive, said apparatus further comprising a temperature-regulating device, by means of which the temperature of the air stream producible by said at least one blower is adjustable.

15. Apparatus according to claim 14, wherein the discharge device has the form of a star-shaped wheel that is fitted on a shaft that extends transversely to the partial channel and above it, that is optionally lockable or rotatable by a preset angle by means of a drive, and wherein the shape of the wheel is adapted to the shape of the shaped parts in such a way that if a shaped part is present under the wheel one of the teeth of said wheel interacts with the shaped part in such a way that the shaped part is held by the wheel in the event of a standstill of the wheel and the shape part is conveyed by a preset angle from the outlet of the partial channel in the event of a rotation of the wheel.

16. Apparatus according to claim 14, wherein the discharge devices of the partial channels are coupled with one another by group in such a way that blocking or releasing of a shaped part occurs simultaneously in all partial channels of a group.

17. Apparatus according to claim 15, wherein the discharge devices of the partial channels are coupled with one another by group in such a way that blocking or releasing of a shaped part occurs simultaneously in all partial channels of a group.

18. Apparatus according to any one of claims 14 to 17, wherein outlets of the partial channels enter collection channels the outlets of which in turn enter a single common end channel, whereby the clear width of the collection channels and of the end channel correspond approximately to the width of a shaped part, and wherein in the collection channels and in the end channel air inlet openings of the same type as in the channel and in the partial channels are provided for advancing the shaped parts.

19. Apparatus according to claim 18, wherein all partial channels extend parallelly to one another and to the channel and that two symmetrically mirrored collection channels oriented towards each other transversely with respect to the partial channels are provided, the collection channels ending on a symmetrical deviation piece in the shape of a wedge bent concavely on both sides in the shape of a funnel in the common end channel that extends in turn parallelly to the partial channels.

20. Apparatus according to claim 19, wherein the discharge devices of the partial channels entering a common collection channel form two groups and wherein both groups of discharge devices are mechanically coupled together in such a way that releasing of the shaped piece occurs alternately either into only one or into only the other of the collection channels.

21. Apparatus according to claim 19, wherein a control device is provided that controls the discharge devices in such a way that at any moment only shaped pieces arrive at the deviation piece from one of the two collection channels.

22. Apparatus according to claim 14, and further comprising at least one filter for cleaning the air stream producible by the blower.

23. Apparatus according to claim 14, wherein the air throughput of the blower is adjustable in such a way that within all conveying spaces in which shaped parts move a preset minimum overpressure with respect to the environment dominates.

* * * * *

UNITED STATES PATENT AND TRADEMARK OFFICE
CERTIFICATE OF CORRECTION

| | |
|---|---|
| PATENT NO. | : 7,223,060 B2 |
| APPLICATION NO. | : 10/496569 |
| DATED | : May 29, 2007 |
| INVENTOR(S) | : R. Weidenmüller |

It is certified that error appears in the above-identified patent and that said Letters Patent is hereby corrected as shown below:

On the front page of the patent in section (30) "Foreign Application Priority Data" change: "Nov. 13, 2002 (DE) ……………..101 57 703" to --Nov. 24, 2001 (DE)……………....101 57 703--.

Signed and Sealed this

Fourth Day of November, 2008

JON W. DUDAS
*Director of the United States Patent and Trademark Office*